(12) United States Patent
Wookey

(10) Patent No.: US 7,761,395 B2
(45) Date of Patent: Jul. 20, 2010

(54) SYSTEM AND METHOD FOR SCALABLE PROCESSING OF COLLECTED KNOWLEDGE BY CREATING KNOWLEDGE GENERATION NODES

(75) Inventor: Michael J. Wookey, Los Gatos, CA (US)

(73) Assignee: Oracle America, Inc., Redwood City, CA (US)

( * ) Notice: Subject to any disclaimer, the term of this patent is extended or adjusted under 35 U.S.C. 154(b) by 250 days.

(21) Appl. No.: 11/510,758

(22) Filed: Aug. 28, 2006

(65) Prior Publication Data

US 2008/0071715 A1   Mar. 20, 2008

(51) Int. Cl.
  *G06N 5/00*   (2006.01)
  *G06F 9/44*   (2006.01)
(52) U.S. Cl. .......................................... 706/45; 717/120
(58) Field of Classification Search .................... 706/45
  See application file for complete search history.

(56) References Cited

U.S. PATENT DOCUMENTS

2005/0192979 A1*  9/2005  Keller et al. ................. 707/100
2006/0248309 A1* 11/2006  D'Alterio et al. ........... 711/206
2006/0253431 A1* 11/2006  Bobick et al. .................. 707/3
2007/0169079 A1*  7/2007  Keller et al. ................. 717/168
2008/0097947 A1*  4/2008  Stich et al. ..................... 706/47

* cited by examiner

*Primary Examiner*—Donald Sparks
*Assistant Examiner*—Li-Wu Chang
(74) *Attorney, Agent, or Firm*—Marsh Fischmann & Breyfogle LLP; Kent A. Lembke; Jonathon A. Szumny

(57) ABSTRACT

A knowledge generation machine (KGM) that can scale to the high volumes of software processing that may be required, as well as manage the unpredictable nature of the size of each processing element, is provided. A KGM master dynamically creates and destroys KGM nodes based on availability, performance, and resource allocation. Unlike the conventional systems, the present KGM receives performance feedback from KGM nodes and can use that performance information in determining which KGM nodes should be assigned information, reused, or destroyed. Further, efficient garbage collection ensures that resources can be de-allocated when needed. Thus, the KGM can scale to handle large spikes of incoming information.

20 Claims, 9 Drawing Sheets

SYSTEM AND METHOD FOR SCALABLE PROCESSING OF COLLECTED KNOWLEDGE BY CREATING KNOWLEDGE GENERATION NODES

CROSS-REFERENCE TO RELATED APPLICATIONS

This Application is related to the following U.S. patent applications, which are filed concurrently with this Application, and which are incorporated herein by reference to the extent permitted by law:

Ser. No. 11/510,702, entitled "System and Method for Cross-Channel Dependency Resolution in a Dependency Model."

Ser. No. 11/510,625, entitled "System and Method for Information Collection for an Adaptive Software Model."

Ser. No. 11/510,626, entitled "System and Method for Generating an Adaptive Software Knowledge Model Incorporating New Information with Model Dependency Analysis."

FIELD OF THE INVENTION

The present invention generally relates to knowledge base generation for software deployment, and relates more particularly to a scalable system for knowledge processing.

BACKGROUND

As enterprise computing environments become larger and more complex, so grows the difficulty of software deployment in those enterprise computing environments. Software deployment requires knowledge of the software and hardware environments of the underlying system, as well as compatibility issues that might arise between the deployable software and the existing environments. Accordingly, software developers attempt to provide users with a knowledge base for deploying and installing software according to previously-validated installation scenarios. However, the deployment rules defined in a conventional knowledge base often provide a very narrow and constrictive path for installing a specific component, because component developers have limited resources to validate the infinite possible environmental permutations in a customer system. As a result, software components are typically shipped with a single (or very few) possible installation scenarios, producing frequent installation deadlocks.

For example, a component that is about to be installed may require a specific resource. However, another component that is already installed in the system may require a different version of that same resource. Traditional deployment rules may be too limited, and dictate that these two components cannot be mutually installed on the same system. This behavior forces administrators to spend valuable time tinkering with installed components, guessing what will and will not work, and checking various permutations. Other frequent deployment problems arise when the software component builders, anticipating that their installation rules will be too constrictive, opt to define very generic rules that they are unable to test.

The problem is exacerbated in open source environments. Open source environments lends themselves very well to customization, for example, by changing Operating System (OS) functionality, adding middleware, adding third party applications, or installing proprietary products. However, that same benefit of customization is the source of challenges in creating a knowledge base for the deployment and maintenance of software components in these environments. The challenges of building a customized operating environment, implementing fixes, and installing proprietary and home-grown applications all require a deep and unique knowledge of the underlying OS that is typically not required in a proprietary operating environment (such as Windows), where the operating system vendor and software developers may execute software integrity tests and do not leave room for customizations. Windows is a trademark of Microsoft Corp. in the United States and other countries. All other company and product names may be trademarks of their respective companies.

To overcome these problems, a knowledge generation machine may be employed. The knowledge generation machine provides an automated method to build a knowledge base for collecting information about software and software environments, determining dependencies among software components, and generating deployment rules for the software. The knowledge generation machine collects knowledge from various sources, performs knowledge processing on the collected information, and produces a knowledge model. Using that knowledge model, a dependency model can be produced to allow for the generation of deployment rules for installing the software component in a computing environment.

One of the problems in knowledge processing is the scalability of converting mass amounts of information into relatively small amounts of formatted and related knowledge. For example, when a new OS is released, including versions for various hardware platforms, there may be gigabytes of code and associated information to process. Thus, there is a need for a knowledge generation machine that can scale to handle these large spikes in information, so that a knowledge base may be provided to customers quickly.

Another problem in collecting knowledge for a knowledge base for software dependency management is that the information can come from many sources. Though the software developer will provide a base of information about a software component, there is also information that is published about the software from other sources. Thus, there is a need to include this information to understand, correlate, and expand the dependency model in order to realize a complete set of the dependencies. Having the complete set of dependencies is an important factor as it directly affects the customer's adoption of the software solution.

Yet another problem of knowledge base generation is understanding and declaring the knowledge model a priori. Often this requires an evolutionary approach that relies on highly manual operations to extend the knowledge model and apply new logic to the knowledge model as it becomes available. This manual expansion means a delay before new information becomes available and is placed into the knowledge model. Accordingly, there is a need to provide a knowledge model that expands and adapts as new information is acquired, without the need for manual expansion.

Yet another problem in knowledge processing is the effect of knowledge processing segmentation on dependency resolution. Knowledge processing is often segmented upon traditional lines, e.g., by OS or by hardware version. This segmentation can cause a problem, however, when the dependency model for a software component includes unexpected dependencies between the element nodes that cause an irresolvable reference that should pass across the predefined segmentation. Often this irresolvable reference is left as an error state, but in software dependency management it is critical to maintain and manage this cross-segment dependency.

SUMMARY

A knowledge generation machine (KGM) that can scale to the high volumes of software processing that may be needed, as well as manage the unpredictable nature of the size of each processing element, is provided. A KGM master dynamically creates and destroys KGM nodes based on availability, performance, and resource allocation. Unlike conventional systems, the present KGM receives performance feedback from KGM nodes and can use that performance information in determining which KGM nodes should be assigned information, reused, or destroyed. Further, efficient garbage collection ensures that resources can be de-allocated when needed. Thus, the KGM can scale to handle large spikes of incoming information.

Systems, methods, and computer products consistent with the present invention are now provided that overcome the limitations previously described by providing, in one embodiment consistent with the present invention, a method in a data processing system for processing knowledge collected about a software component, the system including a knowledge generation (KG) master and a plurality of KG nodes. The method includes acquiring, by the KG master, new information about the software component; determining whether one of the plurality of KG nodes should process the new information; if one of the plurality of KG nodes can process the new information, assigning the new information for processing by that KG node; and if one of the plurality of KG nodes cannot process the new information, creating a new KG node and assigning the new information for processing by the new KG node.

Determining whether one of the plurality of KG nodes should process the new information may be based on the availability of the plurality of the KG nodes, or on whether one of the plurality of the KG nodes is preconfigured to process the new information. The method may further include receiving performance information from at least one of the plurality of KG nodes. Determining whether one of the plurality of KG nodes should process the new information may be based in part on the performance information. Garbage collection may be performed on the plurality of KG nodes based in part on the performance information. The method may further include performing garbage collection on the plurality of KG nodes, wherein garbage collection may be based on resources allocated to a KG node, or on the frequency of use of a KG node for processing. Acquiring new information may be achieved via scheduled crawls of the Internet.

Another embodiment consistent with the present invention is directed to a computer-readable medium storing computer-readable instruction for performing a method for processing knowledge collected about a software component in a system including a knowledge generation (KG) master and a plurality of KG nodes. That method includes the steps of acquiring, by the KG master, new information about the software component; determining whether one of the plurality of KG nodes should process the new information; if one of the plurality of KG nodes can process the new information, assigning the new information for processing by that KG node; and if one of the plurality of KG nodes cannot process the new information, creating a new KG node and assigning the new information for processing by the new KG node.

Determining whether one of the plurality of KG nodes should process the new information may be based on the availability of the plurality of the KG nodes, or on whether one of the plurality of the KG nodes is preconfigured to process the new information. The method may further include receiving performance information from at least one of the plurality of KG nodes. Determining whether one of the plurality of KG nodes should process the new information may be based in part on the performance information. Garbage collection may be performed on the plurality of KG nodes based in part on the performance information. The method may further include performing garbage collection on the plurality of KG nodes, wherein garbage collection may be based on resources allocated to a KG node, or on the frequency of use of a KG node for processing. Acquiring new information may be achieved via scheduled crawls of the Internet.

Yet another embodiment consistent with the present invention is directed to a data processing system for processing knowledge collected about a software component. The system includes a plurality of knowledge generation (KG) nodes; a memory storing a program that acquires new information about the software component, determines whether one of the plurality of KG nodes should process the new information, and if one of the plurality of KG nodes can process the new information, assigns the new information for processing by that KG node, and if one of the plurality of KG nodes cannot process the new information, creates a new KG node and assigns the new information for processing by the new KG node; and a processor executing the program.

Other systems, methods, features, and advantages of the invention will become apparent to one with skill in the art upon examination of the following figures and detailed description. It is intended that such additional systems, methods, features, and advantages be included within this description and be within the scope of the invention.

BRIEF DESCRIPTION OF THE DRAWINGS

The accompanying drawings, which are incorporated in and constitute a part of this specification, illustrate an implementation of the invention and, together with the description, serve to explain advantages and principles consistent with the invention. In the drawings.

DETAILED DESCRIPTION

Reference will now be made in detail to an implementation consistent with the present invention as illustrated in the accompanying drawings.

A Knowledge Generation Machine (KGM) is used to automate the generation of knowledge bases. The KGM takes software components from various sources (e.g., Sun, RedHat, and Novell) as input and generates certified components and associated knowledge (deployment rules) as output. The KGM is made up of a set of KGM master components, which control the knowledge generation process, and a set of KGM node components, which are responsible for executing processing modules (e.g., component harvesters and data miners).

The KGM is the automatic knowledge generator for the knowledge base. It takes as input software from a variety of sources and produces as output a validated set of authenticated components and their corresponding exact deployment rules. The KGM provides the following services: acquires appropriate components, extracts data from the components, prepares acquired components and extracted data for use in internal systems, generates knowledge from the data, verifies the knowledge, transforms a verified knowledge base into a Universal Knowledge Base (UKB), and delivers a UKB to the public servers for client download. Components are entities that can be examined and installed by or on the system. They generally fall into three major categories: 1) software packaged in known ways, such as Red Hat packages, Solaris packages, or tarballs. 2) software that controls off-the-shelf hardware devices and 3) operating system software from various sources. As outputs, the KGM provides a validated UKB and a corresponding component repository, including exact and reliable rules for deploying supported components, as well as the components themselves, tested for installation integrity.

Figure 1:
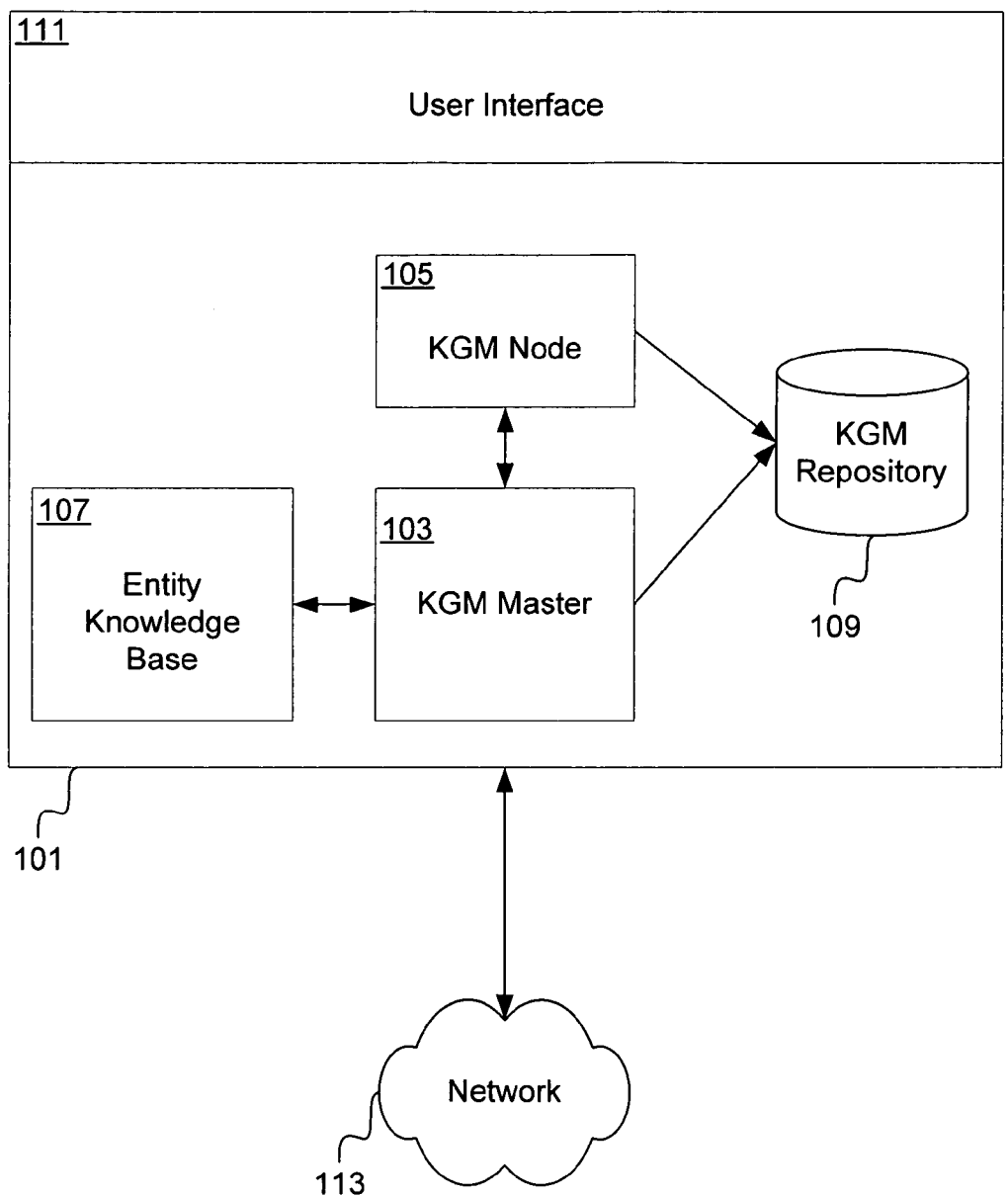
FIG. 1 illustrates an overview of a knowledge generation machine consistent with the present invention.

FIG. 1 illustrates a high-level architecture of the KGM 101, in accordance with one embodiment consistent with the present invention. Architecturally, the KGM 101 may be a distributed system, or embodied in a single system. In the exemplary embodiment, the KGM 101 comprises a KGM master 103 controlling at least one KGM node 105. One of ordinary skill in the art will recognize that there may be any number of KGM masters and any number of KGM nodes assigned a KGM master. Both KGM masters and KGM nodes may be daemon processes, which wait for input from their controlling system. The KGM is controlled by a KGM operator via user interface 111 while KGM nodes are controlled by their respective KGM masters.

KGM master 103 performs, for example, scheduling and executing tasks, load balancing KGM nodes, and providing online KGM system status, like task status, component information, etc. KGM node 105 executes various tasks doled out by KGM master 103, and may be used by a KGM master to perform specific KGM tasks, for example, data acquisition and preparation rules generation, UKB generation and delivery, and rules validation. KGM nodes may receive their instructions from the KGM master via, for example, an XML-based remote procedure call (RPC) protocol.

KGM 101 may further include one or more KGM repository 109 that is accessible by the KGM master 103 and KGM node 105, the repository storing information collected by the KGM nodes. The KGM may further comprise an Entity Knowledge Base (ENKG) 107 storing knowledge about software entities known to the system. The KGM 101 collects information from outside sources via network 113.

Figure 2:
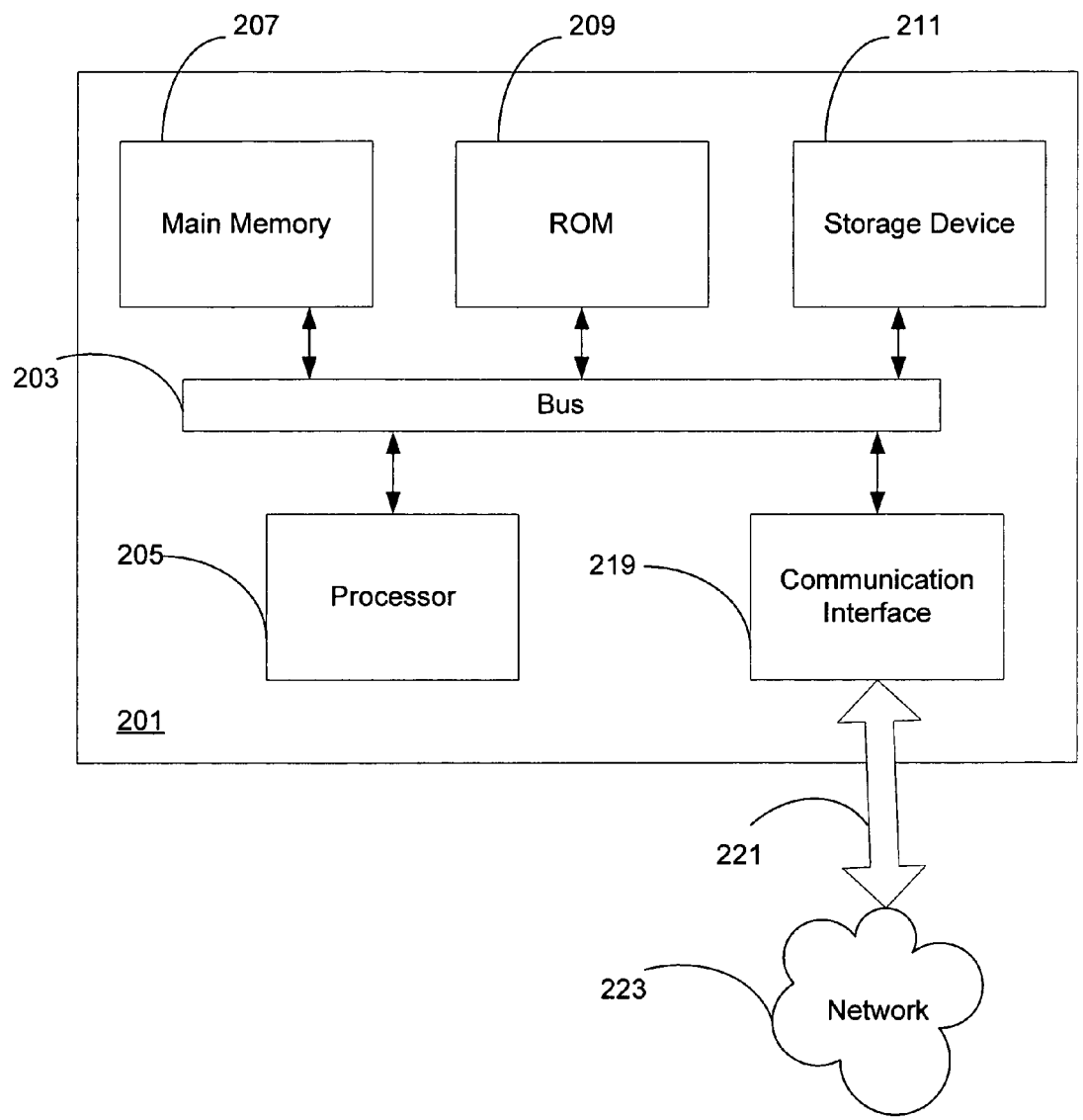
FIG. 2 illustrates an exemplary computer system.

Turning to FIG. 2, an exemplary computer system that can be configured as all or part of the KGM 101 consistent with various embodiments in accordance with the present invention is now described. Computer system 201 includes a bus 203 or other communication mechanism for communicating information, and a processor 205 coupled with bus 203 for processing the information. Computer system 201 also includes a main memory 207, such as a random access memory (RAM) or other dynamic storage device, coupled to bus 203 for storing information and instructions to be executed by processor 205. The KGM master 103 and KGM node 105 may be computer programs stored in main memory 207. In addition, main memory 207 may be used for storing temporary variables or other intermediate information during execution of instructions to be executed by processor 205. Computer system 201 further includes a read only memory (ROM) 209 or other static storage device coupled to bus 203 for storing static information and instructions for processor 205. A storage device 211, such as a magnetic disk or optical disk, is provided and coupled to bus 203 for storing information and instructions.

According to one embodiment, processor 205 executes one or more sequences of one or more instructions contained in main memory 207. Such instructions may be read into main memory 207 from another computer-readable medium, such as storage device 211. Execution of the sequences of instructions in main memory 207 causes processor 205 to perform the process steps described herein. One or more processors in a multi-processing arrangement may also be employed to execute the sequences of instructions contained in main memory 207. In alternative embodiments, hard-wired circuitry may be used in place of or in combination with software instructions. Thus, embodiments are not limited to any specific combination of hardware circuitry and software.

Further, the instructions to support the system interfaces and protocols of system 101 may reside on a computer-readable medium. The term "computer-readable medium" as used herein refers to any medium that participates in providing instructions to processor 205 for execution. Common forms of computer-readable media include, for example, a floppy disk, a flexible disk, hard disk, magnetic tape, a CD-ROM, magnetic, optical or physical medium, a RAM, a PROM, and EPROM, a FLASH-EPROM, any other memory chip or cartridge, or any other medium from which a computer can read.

Computer system 201 also includes a communication interface 219 coupled to bus 203. Communication interface 219 provides a two-way data communication coupling to a network link 221 that is connected to a local network 223. For example, communication interface 219 may be a network interface card. As another example, communication interface 219 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 219 sends and receives signals that carry digital data streams representing various types of information.

Figure 3:
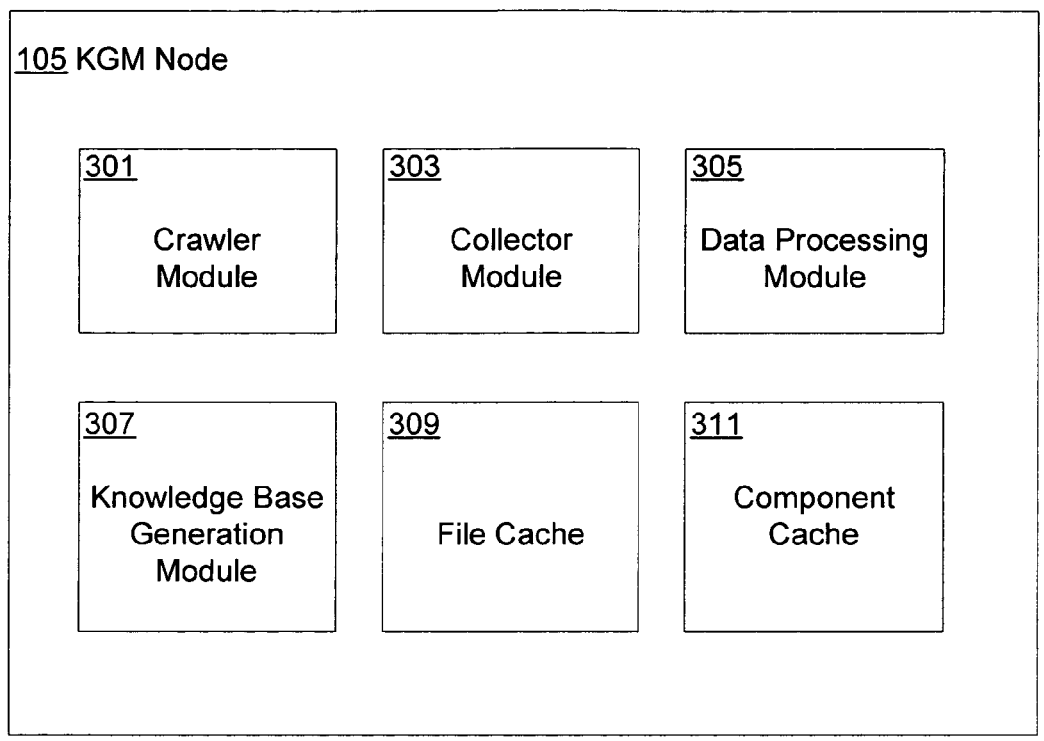
FIG. 3 illustrates a KGM node consistent with the present invention.

Turning attention to FIG. 3, a KGM node 105 is described in greater detail. KGM node 105 includes at least one crawler module 301, at least one collector module 303, a data processing module 305, and a knowledge base generation module 307. Data acquisition starts off with the crawler module, which is responsible for gathering information from the sources, for example, packaged components or incident announcements from software vendors. The crawler module puts all of this information in a file cache 309. The file cache allows crawler module to determine if it has already acquired some piece of information from a source, and if the information has not changed, to not fetch it again. Crawler modules scan vendor websites (e.g., RedHat, Sun, etc.), following links to required pages which contain meta-data that will be used to identify the components to be mined. Regular-expression string matching is performed on the web pages to enable the crawler modules to navigate to the desired pages. The collector module is responsible for taking elements from the file cache, do basic parsing and pattern matching on the elements, and begin to populate an ENKB.

The collector module 303 extracts data from the final page(s) returned by the crawler module 301 to identify which components are needed. The collector module will then try to access these components through the vendor websites and download them for mining as necessary. A component cache 311 is used to hold the signatures of previously downloaded components to prevent repeatedly mining the same component. Components from the component cache are distributed to public servers for later publishing.

The data processing module 305 begins the conversion of raw data into a knowledge base. The data processing module takes harvested components from the ENKB and extracts as much data from them as possible. For example, for a harvested RPM, the data processing module may extract information about files, libraries, symbols, and the like that the RPM provides and others that it requires from other RPMs. The data processing module may include various sub-modules, such as a miner module. There may be a different type of miner module for every kind of data that can be extracted from a component. After extraction, the data is stored in the ENKB. Data processing module output includes, but is not limited to, files provided by the package including the full path and filename for installation; capabilities declared explicitly to be provided by the package; relations between entities such as whether one entity requires another; and location in the component tree for every piece of data. Additionally, the data processing module may integrate additional information, such as incident notifications, into the ENKB relationships. Such information can be cross-linked. For example, an incident can be related to more than one distribution, or an incident can be applicable to more than one component.

The knowledge base generation module 307 takes the mined information from the ENKB and may produce a closed, complete, and consistent set of components (inventory) and installation/deployment rules. The knowledge base generation module takes pieces of mined data for the view and generates installation/deployment rules for the matching inventory.

The KGM uses a principle of segmentation to allow scaling of the inbound knowledge for a software product. Channels are created that segment software products down traditional lines, such as by version or by hardware architecture. For example, the software product Solaris may have a channel directed to a SPARC architecture and another channel directed to an AMD64 architecture. For each channel, a knowledge base is created, dependencies are modeled, and the information is provided to public servers. Channel dependency modeling is described in greater detail below.

Figure 4:
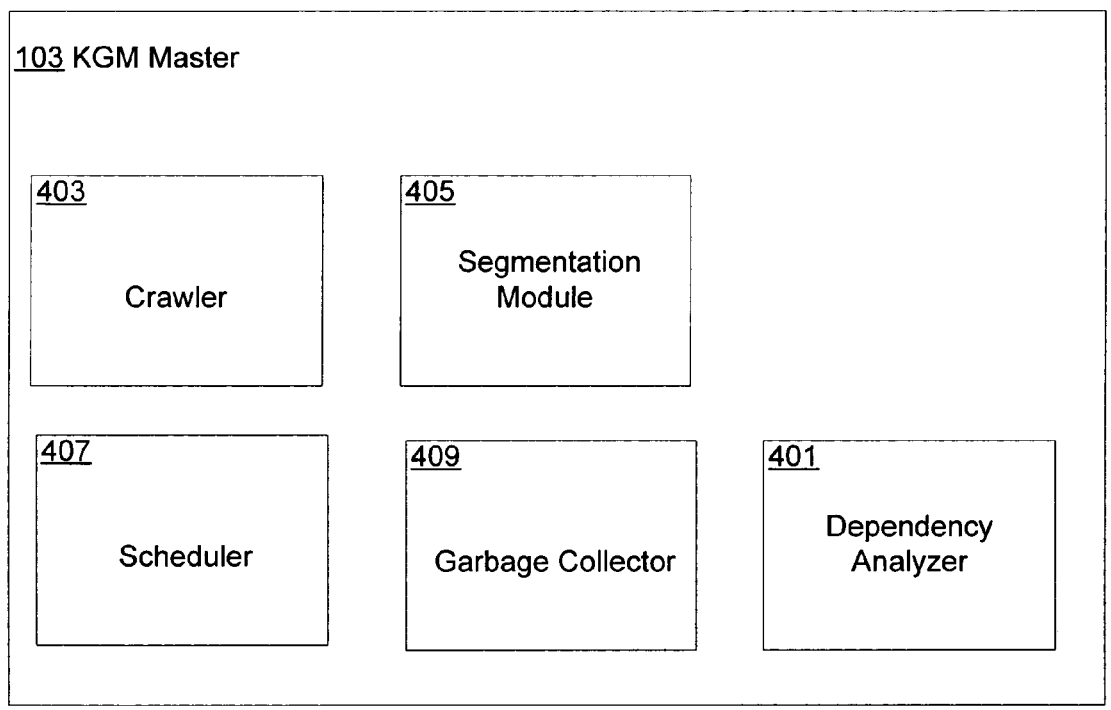
FIG. 4 illustrates a KGM master consistent with the present invention.

Turning attention to FIG. 4, a KGM master 103 is described in greater detail. KGM master 103 includes a dependency analyzer 401, at lest one crawler 403, a segmentation module 405, a scheduler 407, and a garbage collector 409. Crawler 403 is similar to the KGM node crawler 301. Scheduler 407 maintains a schedule that instructs crawler 403 to probe appropriate information sites for new information. Upon detection of new information, the scheduler assigns the data stream of new information to a node, or creates a new node, based on the amount of crawler hits. Scheduler 407 uses a load balancing algorithm to decide when to spawn a new node for processing, and may reuse existing nodes that have completed or partially completed previous jobs. This feature prevents the overhead of newly spawned nodes and network connectivity initialization. Scheduler 407 maintains a list of the data acquisition processes that are allocated to existing nodes. Scheduler 407 also acquires performance criteria from the node periodically, and based on that criteria, determines whether to spawn a new node, reuse a free node, or wait for a node to become available.

Segmentation module 405 classifies newly found information according to the appropriate channel. Accordingly, scheduler 407 may assign a data acquisition process to a node already configured for that channel. Garbage collector 409 manages a garbage collection process that runs over nodes that exist. Garbage collector 409 analyzes current resource allocation across the nodes and cleans up not only the least-used nodes, but those which have the highest number of resources allocated to them from a previous heavy process. Dependency analyzer 401 determines cross-channel dependencies, and will be described in greater detail below.

Figure 5:
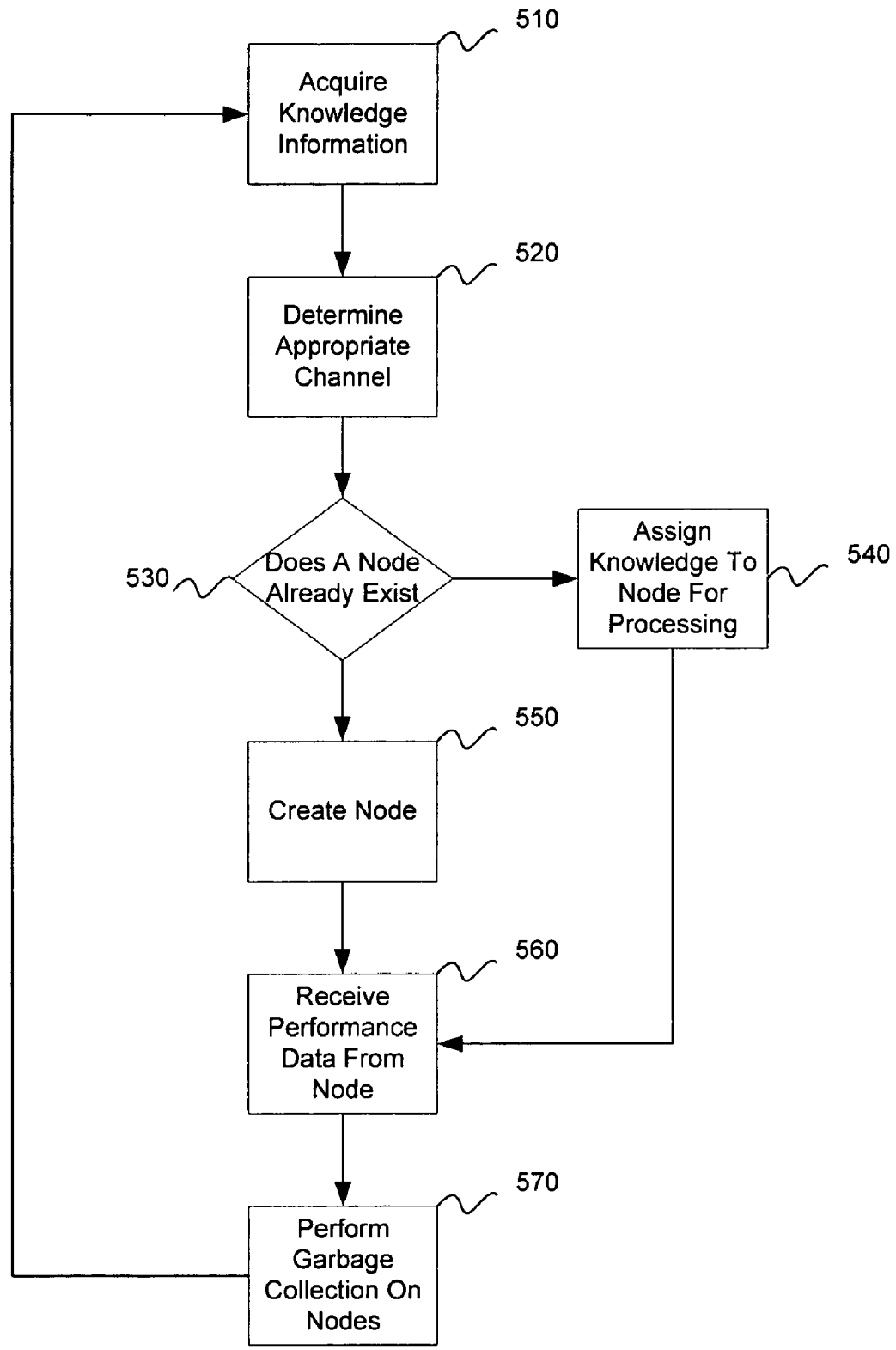
FIG. 5 illustrates a method for scaling knowledge processing consistent with the present invention.

Referring to FIG. 5 along with FIG. 4, a method for managing nodes in a knowledge generation machine is described. Crawler 403 acquires new information that is not already in the knowledge base (step 510). Segmentation module 405 determines which channel the new information belongs to, and informs scheduler 407 (step 520). Scheduler 407 then determines whether there is an existing node for a matching knowledge module, or whether a new node must be created (step 530). When scheduler 407 creates an new node and applies a knowledge module to the node for processing, this node may be kept resident for a period of time upon task completion. If more information is acquired by the KGM master 103, the master reviews its stack of pending nodes and determines that one of them matches the knowledge module requirements of the inbound stream, the data stream is passed through to that already existing node (step 540). Otherwise, a new node is created (step 550). Alternatively, the master may simply wait until a node becomes available.

The KGM master 103 then periodically acquires performance information for each node (step 560). Node performance is related to the knowledge module type, which in turn matches the inbound data type, the size of the inbound data, and the resources available to the node (platform resources). The KGM master 103 uses this information to assess which node to pass the new inbound stream of knowledge into for optimal performance in the future. For example, a high input bandwidth of processing may occur, during which time many nodes are initially spawned to cope with the information flow. Some of these nodes may well have resource conflicts with other nodes running in the same environment (OS or system), which affects their overall performance. As the KGM master 103 learns this performance information, it reprioritizes the lesser performing environments and passes new data streams to the well-performing nodes for processing. Also periodically, the garbage collector 409 analyzes the least performing and related least-used nodes and de-allocates them from the system (step 570). Accordingly, other nodes within the same physical resource may increase in performance because of fewer resource contention situations.

Figure 6:
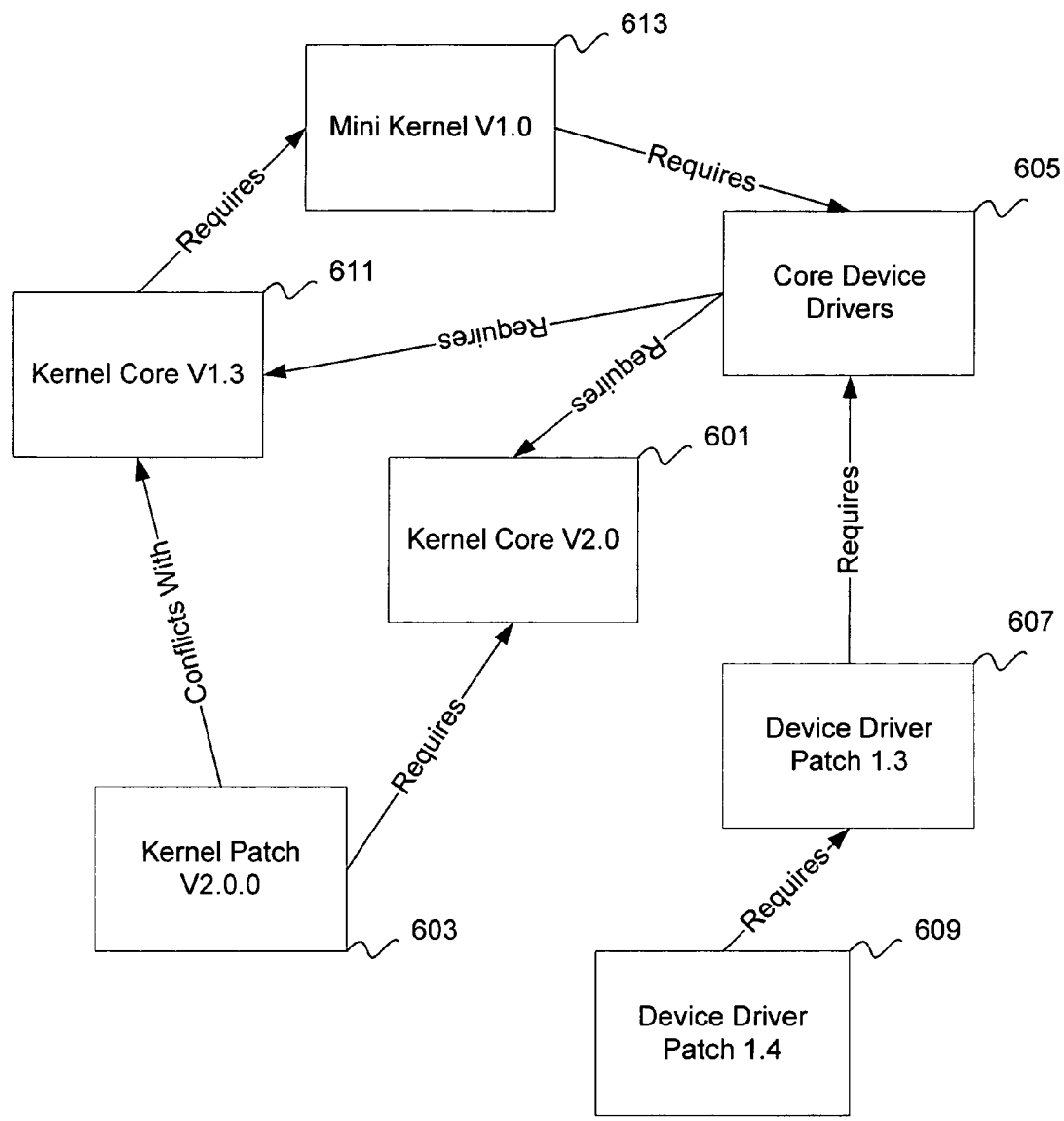
FIG. 6 illustrates an exemplary dependency model consistent with the present invention.

FIG. 6 depicts an exemplary dependency model. The dependency model shows that kernel patch V2.0.1 603 and core device drivers 605 both require kernel core V2.0. Device driver patch 1.4 609 requires device driver patch 1.3 607, which in turn requires core device drivers 605. Core device drivers 605 also requires kernel core V1.3 611, which conflicts with kernel patch 2.0.1 603. Kernel core V1.3 611 requires mini kernel V1.0 613, which requires core device drivers 605, which requires kernel core V1.3 611. This is an example of a circular dependency.

The KGM takes inputs from many sources and converts them into a centralized element and dependency model. This general model which represents what is needed to define a complete software dependency model, can be thought of as a generic template. It reflects software elements which in turn have a series of attributes. It also maintains a list of possible types of information and sources that can be used to fulfill the components of the model. Much of the information may be derived directly from the software components themselves that contain meta data. Additional information can act to fill out the model as well as create new dependencies.

Information gathered by the KGM is classified and a crawler module 301 and a collector module 303 are assigned to each classification. The crawler module 301 is provided with source URLs where information about software components may be obtained. The collector module 303 extracts the information from a larger information document and places the extracted information in the model. The collector module 303 may be built around the information format itself, so multiple model elements may be fulfilled by one collector module 303. The collector module 303 not only fulfills attribute information within a software component, it also detects problems with dependencies or adds new dependencies into the model. Moreover, vendors sometimes detect problems and release an information notice or software patch that may be subsequently withdrawn. Thus, the dependency model maintained by the collector module 303 maintains time-based knowledge of the dependency having existed at one time.

Thus, the KGM allows the data model to adapt as new sources of information become available that drive new dependencies and dependency types. A dependency is given a weighting that allows the KGM to work around potential circular dependencies. When a circular dependency is encountered, the least-weighted dependency is removed to break the circular dependency chain.

When a collector module 303 is created, the following illustrative attributes of the collector module 303 are defined: 1) An array of data sources for the collector module 303, 2) the output data that can be extracted from the data sources, 3) the format of the data, 4) the dependencies that can be created, and 5) the relative importance of the dependencies. The collector module 303 manages dependency creation, and applies the following illustrative processing to the dependency model: 1) creation of a dependency as declared by the definition, 2) summation of weighted dependencies between two nodes in the dependency tree and 3) removal of an existing dependency. The collector module 303 manages the expansion of an in-memory model. Within the model are nodes of software that can be connected by dependencies. The collector module 303 parses the information within the inbound software package searching for the metadata that can be used to create dependencies and/or conflicts. This meta data may be described in multiple different ways depending on the software format in use. Two nodes may be connected by multiple dependencies generated by different software inputs. The more dependencies (possibly inherited from other modules) exist, the greater the significance of this overall dependency to the system. Also, a significant conflict may be declared by a new software module introduced into the system, leading to the removal of a dependency.

Figure 7:
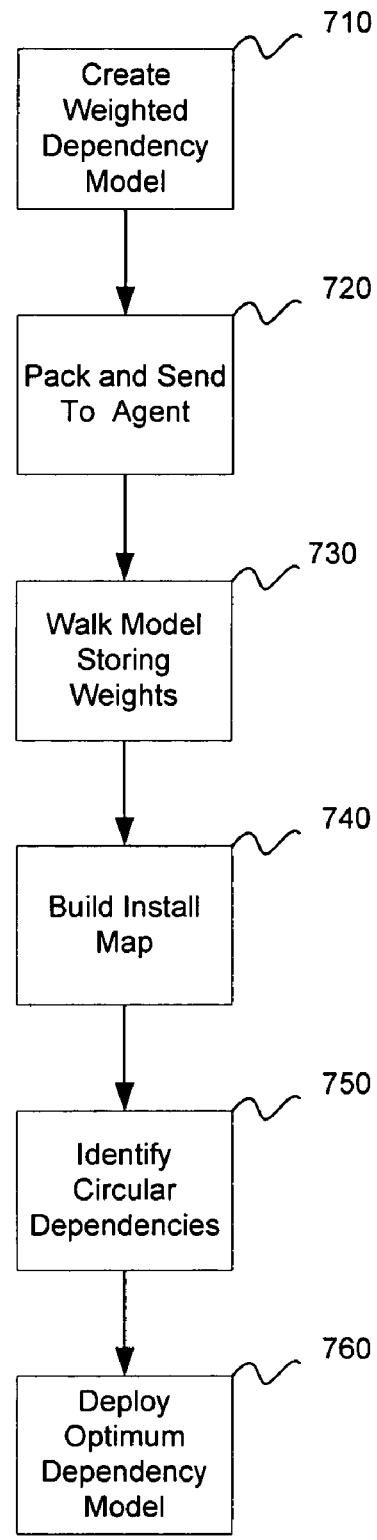
FIG. 7 illustrates a method collecting information for an adaptive software dependency model consistent with the present invention.

Turning attention to FIG. 7, a method for creating an adaptive dependency model is disclosed. In a first stage, the dependencies for a software component are determined and assigned weights based on the level of effect of the dependency (step 710). Once the dependency model is in place with its weighted dependencies, the knowledge base is packed and deployed (step 720). The agent walks the dependency model for the subset of software components that are needed, storing each dependency and its weighting that has been walked (step 730). The agent then builds up an install map of software that must be preinstalled to achieve the required goal (step 740). Once this first pass is built, a second pass is made of the newly created install map (step 750). The agent identifies duplicates of software components that exist that indicate circular dependencies. Upon finding any circular dependencies, the scan then continues and assesses the overall weighting of a dependency prior to the detection and attempts to see if there are other dependency paths through the model of less weighting, but that would not create the circular dependency. Once complete, the most optimum simple dependency model is deployed (step 760).

The collector module 303 may discover a new information attribute or a dependency in the system. If something new is detected, such as a new attribute attached to a software component, the model is automatically extended and the model template is modified. New information can take the form of new types of dependencies or new classifications of software nodes. For example, a web server may not have been declared as needing a modification to a root user. This may be documented in a support document from a source that has only recently been discovered by KGM crawler 301. The KGM maintains a lookup table of likely information based on current styles that are currently collected. The KGM crawler 301 uses these on crawls to ascertain if any new information has been populated since the last crawl through that information type.

Figure 8:
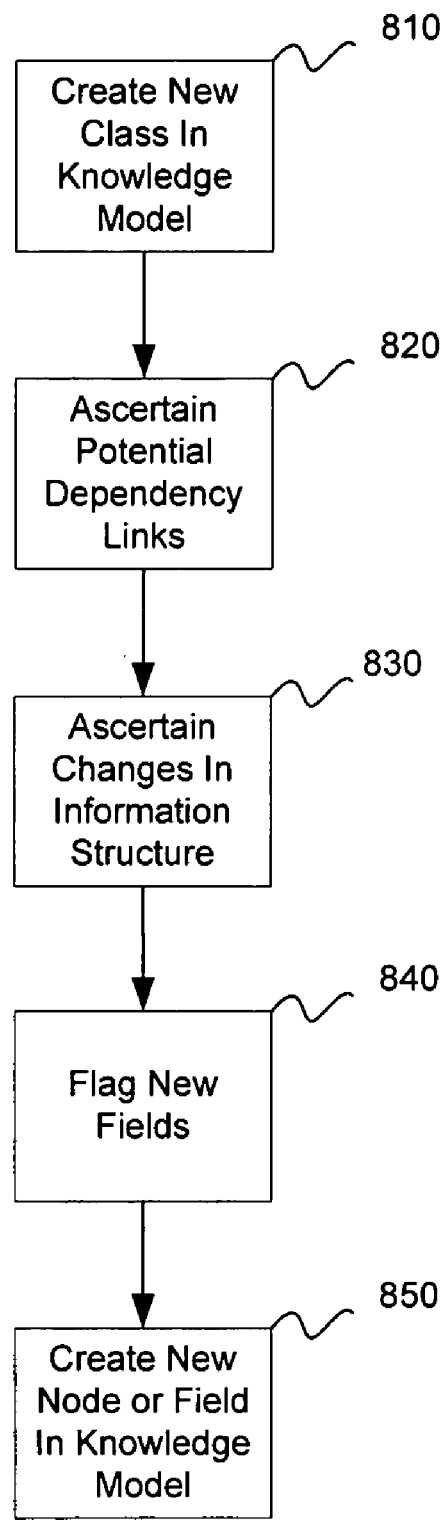
FIG. 8 illustrates a method for dependency analysis in an adaptive dependency model consistent with the present invention.

Referring to FIG. 8, an illustrative method for dependency model adaptation is described. When new information is discovered, a new class is created in the knowledge model (step 810). The model processor then attempts to ascertain potential dependency links based on incoming data (step 820). For example, field information notices may be put on the web in human-readable form that warn users about potential conflicts or dependencies in software. The KGM crawler 301 collects these as they are in generally known places in reasonably consistent form. The KGM crawler 301 then modifies the model to accommodate these "post release" information sources. This is a continual process as the domain model maintains a picture of possible relationships and nodes for the operation of the realized model to succeed. It may be that the format and content of information sources will change over time. Accordingly, the KGM crawler 301 searches through the information provided and determines whether any of the delimited fields (e.g., XML or comma separated fields) have changed in structure. These changes in structure are noted and if there are additions, these new additions are parsed and added into the system (step 830).

Upon handoff to the collector module 303, these new fields are flagged and the collector module 303 takes the context provided in the form of: 1) associative information that is provided with the new field or information, and 2) predefined search keywords within the new field (step 840). The collector module 303 then uses this information to creates a new node or field within a node within the knowledge model to accept the new information (step 850).

The definition of segmentation by channel causes a restriction of focus of dependency resolution to that channel. The resolution of dependencies across channels is a post processing act where the models that are created are re-validated across channels by the KGM master 103. Once the information processing is complete in KGM nodes, the KGM master attempts to resolve dependency links across the channels. The KGM master 103 identifies dependencies among software components in two ways: 1) the validation of declared dependencies by the software vendor, and 2) newly discovered dependencies found by the dependency analyzer 401.

Figure 9:
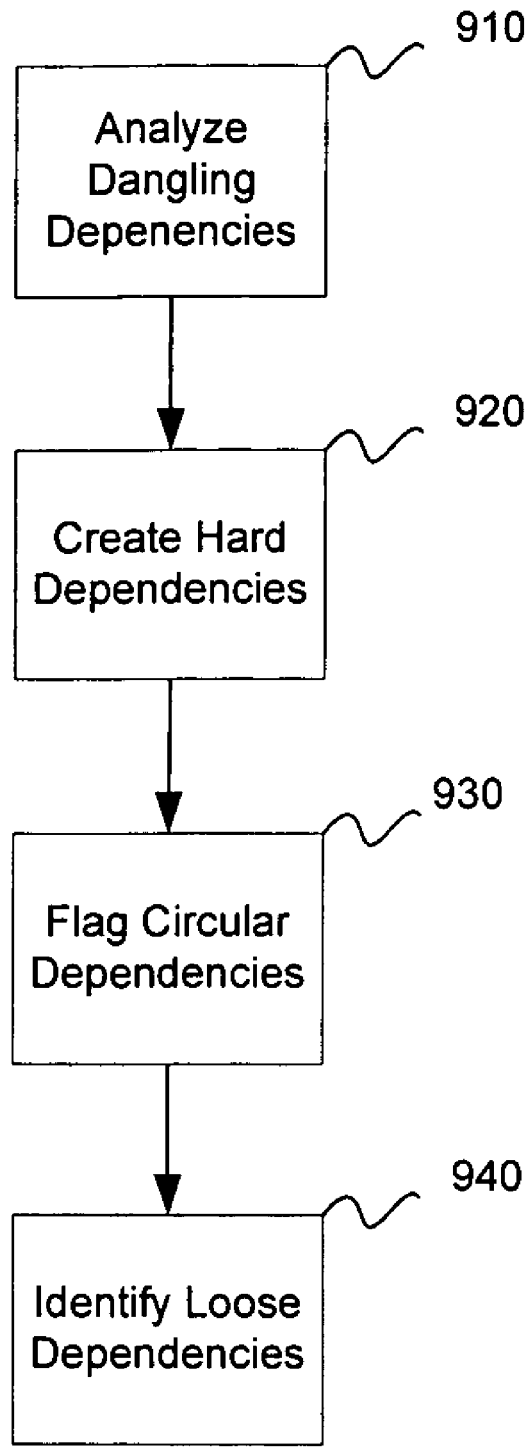
FIG. 9 illustrates a method for cross-channel dependency resolution consistent with the present invention.

Turning attention to FIG. 9, cross-channel dependency processing is now described. In a first stage of cross-channel dependency processing, the dependency analyzer 401 reviews a dangling declared dependency list (step 910). This list is made up of dependencies that the channel processing was unable to validate because they declared dependencies on software that was outside of the defined channel's scope. The dependency analyzer 401 maintains an overall knowledge model for each segmentation it has dispatched to a node. The dependency analyzer 401 uses this model to attempt to resolve the dangling dependency. Dangling dependencies are resolved by the dependency analyzer 401 through a breadth first search using indicators in the dependency definition to localize the search in specific knowledge models. When a dependency is realized, the dependency analyzer 401 creates a new hard dependency within the knowledge outputs (step 920). A hard dependency is considered critical and cannot be overridden by a conflict. The hard dependency identifies the originating software package or file and the target channel and subpackage within the channel. Upon installation processing, a recursive analysis may be performed on the target channel and subpackage within the channel to fulfill the dependency tree.

The dependency analyzer 401 then walks the dependency tree analyzing for other cross-channel dependencies that would create complex circular dependencies (step 930). If one is detected, the circular dependency is cut, an administrator is informed, and the knowledge is flagged as incomplete. The dependency analyzer 401 then resolves loose software component references (step 940). These references are eventualities that can occur where there is no meta-data, when there are no derived dependencies based on deep inspection within the module, or where a deep dependency analyzer within a KGM node has tagged an unfulfilled reference. The dependency analyzer 401 then searches the other resident knowledge bases for loose dependencies and identifies them. A deployment agent can then understand them and request additional knowledge models to fulfill overall needs based on a profile delivered to the agent.

While there has been illustrated and described embodiments consistent with the present invention, it will be understood by those skilled in the art that various changes and modifications may be made and equivalents may be substituted for elements thereof without departing from the true scope of the invention. Therefore, it is intended that this invention not be limited to any particular embodiment disclosed, but that the invention will include all embodiments falling within the scope of the appended claims.

I claim:

1. A method performed in a data processing system including a program in memory which processes knowledge collected about a software component, the system including a knowledge generation master and a plurality of knowledge generation nodes, the method comprising the steps of:
    acquiring, by a crawler module of the knowledge generation master, new information about the software component, wherein the crawler module gathers information about the software component from a plurality of sources;
    receiving, with a scheduler module of the knowledge generation master, performance information from at least one of the plurality of knowledge generation nodes, wherein the scheduler module maintains a schedule that instructs the crawler module to probe at least one of the plurality of sources for new information;
    determining, with the scheduler module of the knowledge generation master, whether one of the plurality of knowledge generation nodes should process the new information including analyzing the performance information;
    if one of the plurality of knowledge generation nodes can process the new information, assigning, with the scheduler module, the new information for processing by that knowledge generation node; and
    if one of the plurality of knowledge generation nodes cannot process the new information, creating, with the scheduler module, a new knowledge generation node and assigning the new information for processing by the new knowledge generation node;
    wherein the new knowledge generation node substantially corresponds to the data type of the new information and handles the size of the new information; and
    wherein each knowledge generation node comprises:
        a crawler module that identifies a plurality of sources of information about the software component and stores the sources of information in a file cache;
        a collector module that retrieves components from the plurality of sources of information and stores the components in a component cache;
        a data processing module that extracts data from the components; and
        a knowledge base generation module for producing deployment rules for the software component from the extracted data.

2. The method of claim 1, wherein the step of determining whether one of the plurality of knowledge generation nodes should process the new information includes determining the availability of one or more of the knowledge generation nodes.

3. The method of claim 1, wherein the step of determining whether one of the plurality of knowledge generation nodes should process the new information includes determining whether one of the plurality of the knowledge generation nodes is preconfigured to process the new information.

4. The method of claim 1, wherein garbage collection is performed on the plurality of knowledge generation nodes based in part on the performance information.

5. The method of claim 1, further comprising the step of performing garbage collection on the plurality of knowledge generation nodes.

6. The method of claim 1, wherein the step of acquiring new information is achieved via scheduled crawls of the Internet.

7. The method of claim 1, further comprising:
    dynamically creating a dependency model based on the new information by identifying additional information concerning other software components which are required for the successful installation of the new information in the software component;
    dynamically developing an installation map effective to collect and install additional information required for the successful installation of the new information into the software component;
    dynamically monitoring the software component and the other software components for changes; and
    modifying the dependency model and the installation map by automatically incorporating the changes to the software components and the other software components upon the determination that the software component or the other software components have changed.

8. The method of claim 1, further comprising:
periodically reprioritizing lesser performing knowledge generation nodes by assigning new information to better performing knowledge generation nodes.

9. The method of claim 5, wherein the step of performing garbage collection includes determining resources allocated to a knowledge generation node.

10. The method of claim 5, wherein the step of performing garbage collection includes determining the frequency of use of a KG node for processing.

11. A computer-readable medium storing computer-readable instruction for performing a method for processing knowledge collected about a software component in a system including a knowledge generation master and a plurality of knowledge generation nodes, the method comprising the steps of:

acquiring, by a crawler module of the knowledge generation master, new information about the software component, wherein the crawler module gathers information about the software component from a plurality of sources;

classifying, with a segmentation module of the knowledge generation master, the new information according to at least one channel that is related to the new information;

determining, with a scheduler module of the knowledge generation master, whether one of the plurality of knowledge generation nodes should process the new information, wherein the scheduler module maintains a schedule that instructs the crawler module to probe at least one of the plurality of sources for new information;

if one of the plurality of knowledge generation nodes can process the new information, assigning, with the scheduler module, the new information for processing by that knowledge generation node; and if one of the plurality of knowledge generation nodes cannot process the new information, creating, with the scheduler module, a new knowledge generation node and assigning the new information for processing by the new knowledge generation node;

wherein the determining of whether one of the plurality of knowledge generation nodes should process the new information includes determining the availability of one or more of the knowledge generation nodes;

wherein the determining of whether one of the plurality of knowledge generation nodes should process the new information includes determining whether one of the plurality of the knowledge generation nodes is preconfigured to process the new information according to the classified channel; and wherein each knowledge generation node comprises:
 a crawler module that identifies a plurality of sources of information about the software component and stores the sources of information in a file cache;
 a collector module that retrieves components from the plurality of sources of information and stores the components in a component cache;
 a data processing module that extracts data from the components; and
 a knowledge base generation module for producing deployment rules for the software component from the extracted data.

12. The computer-readable medium of claim 11, further comprising receiving performance information from at least one of the plurality of knowledge generation nodes.

13. The computer-readable medium of claim 11, further comprising performing garbage collection on the plurality of knowledge generation nodes.

14. The computer-readable medium of claim 12, wherein determining whether one of the plurality of knowledge generation nodes should process the new information includes analyzing the performance information.

15. The computer-readable medium of claim 12, wherein garbage collection is performed on the plurality of knowledge generation nodes based in part on the performance information.

16. The computer-readable medium of claim 13, wherein performing garbage collection includes determining resources allocated to a knowledge generation node.

17. The computer-readable medium of claim 13, wherein performing garbage collection includes determining the frequency of use of a knowledge generation node for processing.

18. A data processing system including a processor which processes knowledge collected about a software component, comprising:

a plurality of knowledge generation nodes each configured for executing at least one processing task supporting generating of a knowledge base for deploying the software component, wherein each knowledge generation node comprises:
 a crawler module that identifies a plurality of sources of information about the software component and stores the sources of information in a file cache;
 a collector module that retrieves components from the plurality of sources of information and stores the components in a component cache;
 a data processing module that extracts data from the components; and
 a knowledge base generation module for producing deployment rules for the software component from the extracted data; and a knowledge generation master comprising a program in memory that includes a crawler module and a scheduler module, wherein the crawler module acquires new information about the software component, wherein the scheduler module determines whether one of the plurality of knowledge generation nodes is available and preconfigured to process the new information, wherein if one of the plurality of knowledge generation nodes is determined available and preconfigured to process the new information, the scheduler module assigns the new information for processing by that knowledge generation node, wherein if one of the plurality of knowledge generation nodes cannot process the new information, the scheduler module creates a new knowledge generation node and assigns the new information for processing by the new knowledge generation node; wherein a processor executes the program;

wherein the new knowledge generation node substantially corresponds to the data type of the new information and handles the size of the new information.

19. The system of claim 18, wherein the program is further adapted for:

dynamically creating a dependency model based on the new information by identifying additional information concerning other software components which are required for the successful installation of the new information; and dynamically developing an installation map effective to collect and install additional information required for the successful installation of the new information.

20. The system of claim 19, wherein the program is further adapted for:

dynamically monitoring the software component and the other software components for changes; and modifying the dependency model and the installation map by automatically incorporating the changes to the software components and the other software components upon the determination that the software component or the other software components have changed.

* * * * *